United States Patent
Perry et al.

(10) Patent No.: US 7,752,615 B1
(45) Date of Patent: Jul. 6, 2010

(54) METHOD AND APPARATUS FOR DEPLOYING UPDATES TO A STORAGE SERVER MANAGEMENT APPLICATION

(75) Inventors: Jay B. Perry, San Jose, CA (US); Timothy J. Thompson, San Jose, CA (US); Shailaja Kamila, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 1452 days.

(21) Appl. No.: 11/118,695

(22) Filed: Apr. 29, 2005

(51) Int. Cl.
G06F 9/44 (2006.01)
G06F 13/24 (2006.01)

(52) U.S. Cl. .................. 717/168; 717/115; 710/260

(58) Field of Classification Search ............. 717/122, 717/168, 101, 178, 173, 115; 707/200; 709/223; 710/260
See application file for complete search history.

(56) References Cited

U.S. PATENT DOCUMENTS

| | | | | |
|---|---|---|---|---|
| 6,167,567 A | * | 12/2000 | Chiles et al. | 717/173 |
| 6,490,690 B1 | * | 12/2002 | Gusler et al. | 714/4 |
| 6,725,453 B1 | * | 4/2004 | Lucas et al. | 717/178 |
| 6,785,706 B1 | * | 8/2004 | Horman | 709/203 |
| 6,931,440 B1 | * | 8/2005 | Blumenau et al. | 709/220 |
| 6,941,453 B2 | * | 9/2005 | Rao | 713/2 |
| 7,370,329 B2 | * | 5/2008 | Kumar et al. | 718/107 |
| 7,500,234 B2 | * | 3/2009 | Hatasaki | 717/168 |
| 2002/0165954 A1 | * | 11/2002 | Eshghi et al. | 709/224 |
| 2003/0191771 A1 | * | 10/2003 | Arrouye et al. | 707/101 |
| 2003/0208587 A1 | * | 11/2003 | Sauer | 709/223 |
| 2004/0044693 A1 | * | 3/2004 | Hadley et al. | 707/200 |
| 2004/0054764 A1 | * | 3/2004 | Aderton et al. | 709/223 |
| 2004/0158817 A1 | * | 8/2004 | Okachi et al. | 717/122 |

* cited by examiner

*Primary Examiner*—Meng-Ai An
*Assistant Examiner*—Tammy Lee
(74) *Attorney, Agent, or Firm*—Perkins Coie LLP

(57) ABSTRACT

According to an embodiment of the invention, a storage server management application (SSMA) includes scripting ability. The scripting ability allows functionality to be added to the SSMA by deploying scripting packages onto the SSMA. The packages may be written by a user having access to the SSMA, and deployed onto the SSMA without affecting the core functionality of the SSMA, and may be easily removed. One package allows a system administrator to monitor the configuration of storage servers monitored by the SSMA by comparing the current configuration of the filers to a standard configuration. Another package monitors best practices for redundant array of inexpensive disks (RAID) systems. Other packages may be added to the SSMA.

22 Claims, 8 Drawing Sheets

METHOD AND APPARATUS FOR DEPLOYING UPDATES TO A STORAGE SERVER MANAGEMENT APPLICATION

FIELD

The present invention generally relates to storage server management applications (SSMAs) and specifically relates to a method and apparatus for updating a SSMA.

BACKGROUND

A network appliance is a processing system that may be connected to a network to provide service to other devices over the network. A file server, or filer, is an example of a network appliance. A filer is a form of storage server which provides file storage and file access to remote clients that request access to the data storage. Another type of storage server, which may be implemented as an appliance, is one which provides clients with block-level access to stored data, rather than file-level access. Such a server can be used in a storage area network (SAN), for example, to provide an interface between clients and mass storage devices.

A multi-appliance management application (MMA) can be used to maintain a storage network. An MMA is a type of storage server management application (SSMA) that can be used to monitor data storage over a network on several different processing systems. For example, an MMA can be used to monitor the storage on several filers. A system administrator can maintain the filers using the MMA, ensuring that the filers continue to have adequate free space, that certain users are not monopolizing storage on a filer, etc. An example of such an MMA is the DataFabric® Manager (DFM) products made by Network Appliance, Inc. in Sunnyvale, Calif. The MMA may provide a user interface (UI) such as a Command Line Interface (CLI) or a Graphical User Interface (GUI) that allows the administrator to more easily observe the condition of the filer. The MMA may comprise an application on another processing system, or it may be a hardware device on the storage network.

A system administrator can use the MMA to manage one or more appliances on a storage network. The UI of the MMA allows the administrator to not only monitor the status of appliances connected to the network, but also to change settings on the appliances. For example, the MMA can be used to add or delete authorized users on a specific filer. The MMA may also be used to determine the type and amount of storage being used on a filer. For example, the MMA may monitor the amount of storage dedicated to audio or video files, and report to the administrator if the amount of storage dedicated to these files exceeds a predetermined threshold. The MMA has an overall view of the appliances, and can also control the function and administration of the appliances.

An MMA may be an application deployed on a server station that is connected to one or more appliances either directly or through a network. The MMA includes a core set of functionality. The MMA may be upgraded by using software patches that modify the core functionality. These modifications may tend to reduce the reliability of the MMA, since the patches modify the basic functionality of the MMA. Further, the patches may be difficult to deploy and difficult to write. What is needed, therefore, is an improved way to add functionality to an MMA.

SUMMARY

The present invention includes methods and apparatuses for deploying updates to a data storage management device. In one method, a package is received, including a script. It is then determined whether the script is a new installation or an update of an existing installation. The package is unpacked into a temporary storage location and verified. The package is then moved into an installation directory.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

The present invention includes methods and apparatuses for deploying updates to a storage server management application. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment. However, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, a storage server management application (SSMA) includes scripting ability. The scripting ability allows functionality to be added to the SSMA by deploying scripting packages onto the SSMA. A package may be, for example, a compressed archive such as a ZIP file. The packages may be written by a user such as a system administrator having access to the SSMA, and deployed onto the SSMA without affecting the core functionality of the SSMA, and may be easily removed. One package allows a system administrator to monitor the configuration of storage servers monitored by the SSMA by comparing the current configuration of the filers to a standard configuration. Another package monitors best practices for redundant array of inexpensive disks (RAID) systems. Other packages may be added to the SSMA.

According to one embodiment of the invention, a script is a program or sequence of instructions that is interpreted or carried out by another program rather than the computer processor (as a compiled program is). Some common scripting languages are Perl, Rexx, Javascript, and Tcl/Tk. In general, scripting languages are easier and faster to code than compiled languages such as C or C++. The scripting ability allows a user (such as a system administrator) to easily add functionality to a SSMA without affecting the core functionality (i.e., the delivered functionality) of the SSMA. The scripting ability also allows for transparency of scripts delivered to the SSMA, allowing a system administrator to examine the script and modify the script before installing it.

Figure 1:
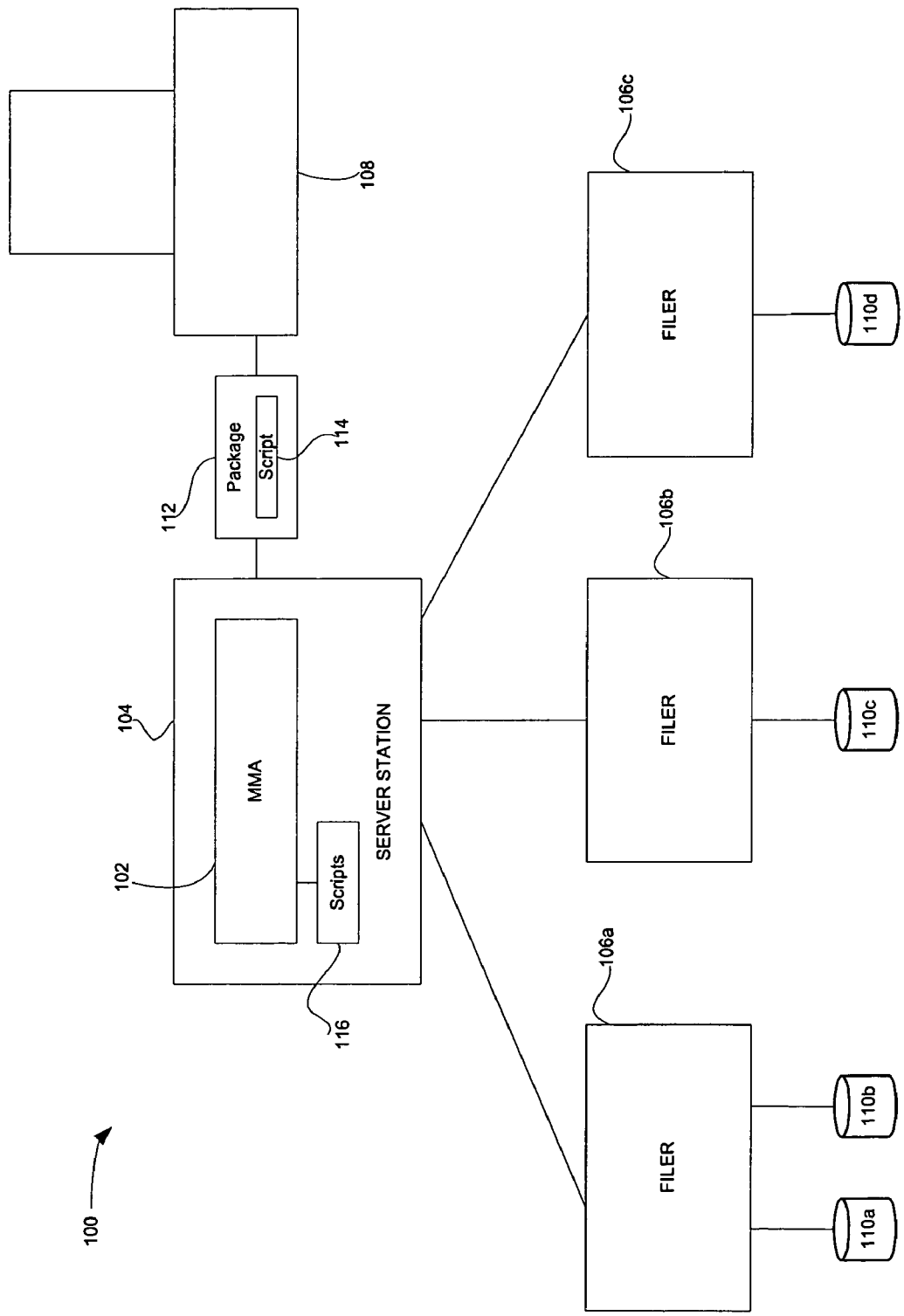
FIG. 1 illustrates a data storage management device monitoring several storage servers attached to a storage network according to one embodiment of the invention.

FIG. 1 illustrates a SSMA monitoring several storage servers attached to a storage network 100 according to one embodiment of the invention. The SSMA may be a multi-appliance management application (MMA) 102 that may be an application program running on a server station 104. The MMA may be, for example, one of the DFM products manufactured by Network Appliance® of Sunnyvale, Calif. The MMA 102 monitors the operation of one or more filers 106. The filers 106 represent one or more storage servers, which may include not only filers, but other appliances such as the NetCach® and/or NearStore® products manufactured by Network Appliance®.

The server 104 may be accessed using a terminal 108 or other computer system. The terminal 108 may be either locally or remotely located, and may access the server 104 through a network such as a local area network (LAN) or a wide area network (WAN) such as the Internet, using a serial cable, etc. The terminal 108 may be a personal computer (PC) or other processing system capable of accessing the MMA 102. The MMA 102 may be, for example, a web-based application that is accessible using the hypertext transmission protocol (HTTP). It is understood that other configurations may be used. For example, the MMA 102 may be a hardware device rather than a software application, and the MMA 102 may be accessible using any appropriate protocol.

The MMA 102 may provide information to a user (such as a system administrator) about the status and configuration of the connected filers 106. The MMA 102 may be presented as a graphical user interface (GUI) that may be available, for example, through a browser such as Microsoft Internet Explorer®. The MMA 102 may monitor information such as available disk space, filer operational status (e.g., operating temperature, uptime, etc.), space allocated to certain users, overall filer usage, etc. The MMA 102 is used to monitor and maintain the filers or other storage servers.

Each filer 106 manages one or more volumes 110. A volume 110 is comprised of one or more physical disk drives, and may be part of a redundant array of inexpensive disks (RAID). Each volume 110 stores the data on the storage network 100, and may be designated for a certain group or purpose. For example, a first volume 110a may include home directories for a first group of users, which a second volume 110b may store data files that are accessible by anyone. The MMA 102 has the ability to sort the volumes 110 in this way.

The MMA 102 allows a system administrator to exert substantial control over the filers 106. For example, the MMA 102 may be used to manage storage on the filers 106, specify users allowed to access the filers 106, etc. The users may be divided into groups based on their access control levels. For example, a script installed by a system administrator may be able to push configuration to/from the filer 106a via the MMA 102 because the system administrator has the appropriate credentials to change the configuration of the filer 106a.

The ability of the MMA 102 to restrict access to certain functions of the MMA 102 as described above can be used with certain embodiments of the invention. For example, if a member of group A attempts to schedule a command (such as executing a script) that uses resources that the member does not have access to, the MMA 102 will not allow the command to be scheduled.

A package 112 may be transmitted from the terminal 108 to the server station 104. The package 112 may be a container for transmitting a script 114. The script 114 is a script created by a user such as any human being interfacing with the terminal 108 to be installed in the MMA 102. The interfacing may occur, for example, using a keyboard, mouse, or other input device of the terminal 108. The package 112 may be, for example, a ZIP file or other compressed archive. The package 112 may also include other files or data needed to execute the script 114, such as executable files, data files, other scripts, etc. The server station 104 includes a cache of scripts 116 that stores scripts that have been transmitted to the server station 104 and may be executed by the MMA 102. As will be described below, a script of the scripts 116 may be scheduled and executed by a system administrator.

Figure 2:
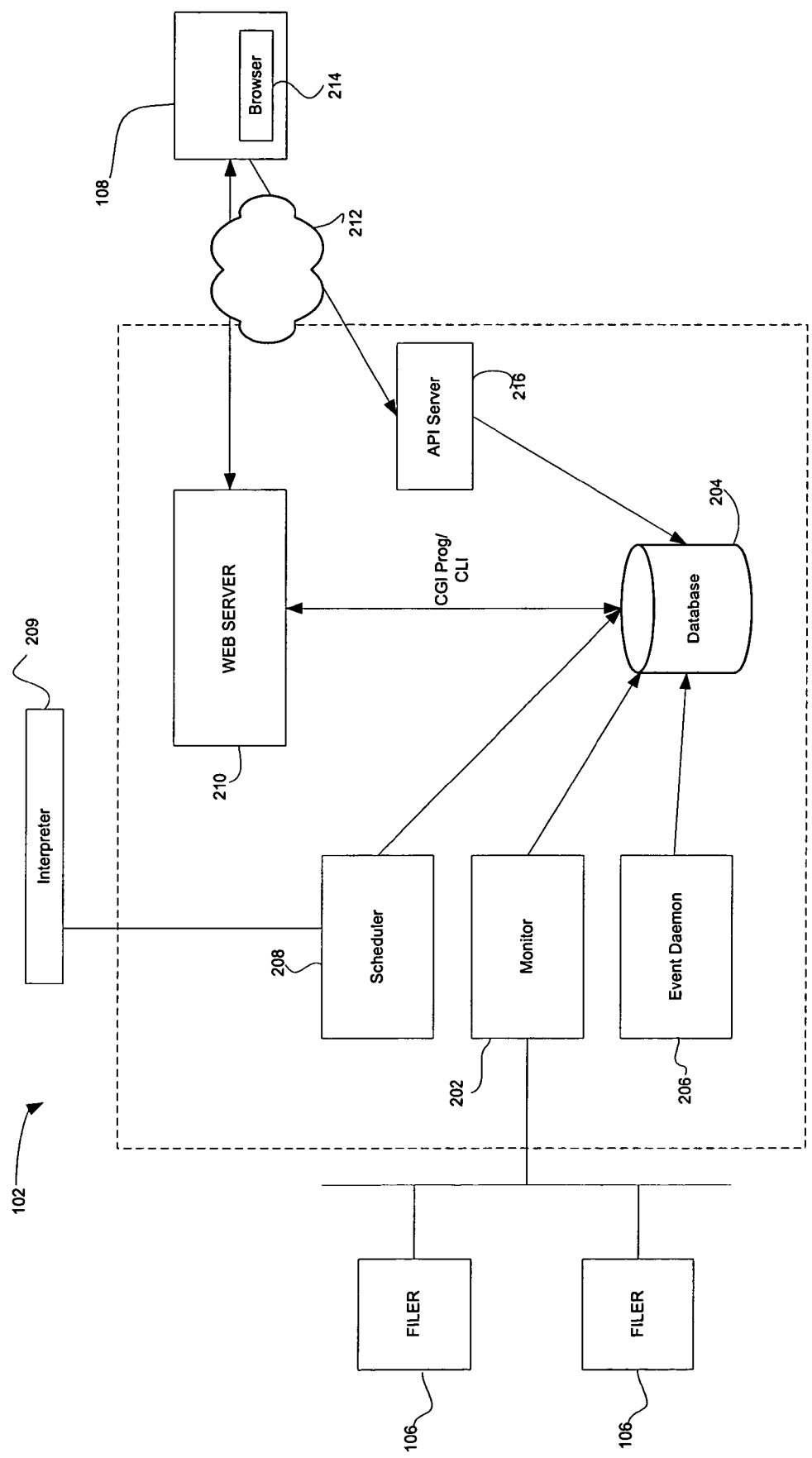
FIG. 2 is a block diagram of a multi-appliance management application.

FIG. 2 is a block diagram of the MMA 102. According to one embodiment, the MMA 102 includes several software components to enable the various functions of the MMA 102. The software components may also be used to enable various embodiments of the invention, including allowing the MMA 102 to perform scripting functions and install packages. As mentioned above, although the MMA 102 is described here as a collection of software components, it is understood that the MMA 102 may alternatively be embodied as a hardware device.

The filers 106 are monitored by a monitor 202. The monitor 202 has discovery capabilities, and is responsible for monitoring the filers 106. For example, the monitor 202 may query the filers 106 to determine current information about the filers 106. The monitor 202 may collect this information at a specified interval, or the filers 106 may notify the monitor 202 when a change in status occurs. The monitor 202 stores information about the filers 106 in a database 204. The monitor 202 is a standalone process that independently retrieves information about the filers 106 and puts the information in the database 204. For example, the information about the filers 106 may include the amount of free space on one of the volumes 110, the number of users on one of the filers 106, the number of filers stored on one of the filers 106, etc.

An event daemon 206 monitors the database 204 to determine when events need to be generated. An event is generated when the conditions for the event are met. An event may simply notify a system administrator that something has occurred, for example that the volume 110a has less than 100 megabytes of free space. The commands scheduled by the administrators or other users may trigger the events. The event daemon 206 is a process of the MMA 102 that generates events and issues them to system administrators.

For example, the event daemon 206 may be used with certain embodiments of the invention to generate an event when the configuration of one of the filers 106 changes. A script that compares a default configuration of a filer to a current configuration of the filer is described below. An administrator may schedule this script to execute at a predetermined time or interval (e.g., once at 3 p.m. today, or every night at midnight). When the script executes, if the condition of the script is met (e.g., the configuration of the monitored filer has changed), an event is generated to notify the system administrator of the changes.

A scheduler 208 may prompt the monitor 202 to perform certain activities. For example, the scheduler 208 may command the monitor 202 to perform a system scan on a specific filer 106. Further, the scheduler 208 may perform scripting functions according to one embodiment of the invention. When a script is executed on the MMA 102, the scheduler 208 may execute the individual instructions. When an administrator schedules commands, the scheduler 208 executes the commands. The event daemon 206 generates an event if the conditions of the commands (e.g., a script) are met. The scheduler may use an interpreter 209, which may be separate from the MMA 102, to execute scripts. The interpreter 209 may be, for example, a practical extraction and reporting language (PERL) interpreter. The interpreter 209 executes the individual commands of the script when instructed to by the scheduler 208.

A web server 210, such as an Apache® server, executes common gateway interface (CGI) programs and command line interface (CLI) instructions from the database 204. The web server 210 generates web pages, such as hypertext markup language (HTML) or extensible markup language (XML) web pages, and transmits them over a network 212, which may be a local area network (LAN) or a wide area network (WAN), such as the Internet. The terminal 108 receives the web pages which may be displayed using a browser 214 such as Internet Explorer®. An application programming interface (API) server 216 may be used to generate the GUI interface of the MMA 102. The API server 216 retrieves information from the database 204 and transmits the information to the terminal 108.

Figure 3:
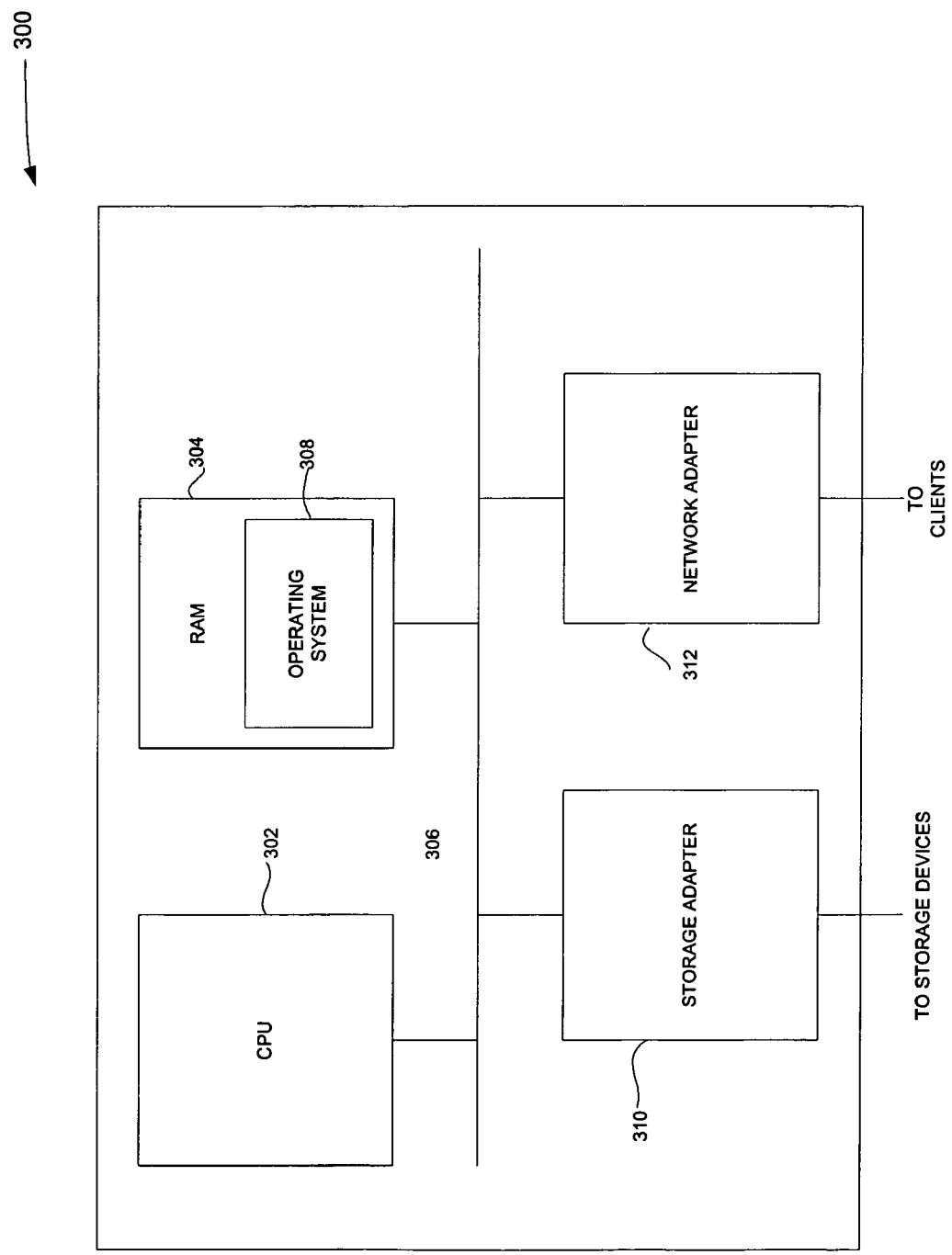
FIG. 3 shows the architecture of a filer according to certain embodiments of the invention.

FIG. 3 shows the architecture of a filer 300, representative one of the filers 106, according to certain embodiments of the invention. A filer is a type of storage server used to store file data. Note that certain standard and well-known components which are not germane to the present invention are not shown. The filer 300 includes a processor 302 and main memory 304, coupled together by a bus system 306. The bus system 306 in FIG. 3 is an abstraction that represents any one or more separate physical buses and/or point-to-point connections, connected by appropriate bridges, adapters and/or controllers. The bus system 306, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 302 is the central processing unit (CPU) of the filer 300 and, thus, controls the overall operation of the filer 300. In certain embodiments, the processor 302 accomplishes this by executing software stored in main memory 304. The processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 304, which is generally some form of random access memory (RAM), stores at least a portion of the operating system 308 of the filer 300. Techniques of the present invention may be implemented within the operating system 308, as described further below. The operating system 308 may be, for example, the ONTAP operating system by NetApp®. Also connected to the processor 302 through the bus system 306 are a storage adapter 310 and a network adapter 312. The storage adapter 310 allows the filer 300 to access the external mass storage devices and may be, for example, a Fibre Channel (FC) adapter or SCSI adapter. The network adapter 312 may include an Infiniband, FC, Ethernet, or other adapter, and may provide a connection allowing remote clients to communicate with the filer 300.

Figure 4:
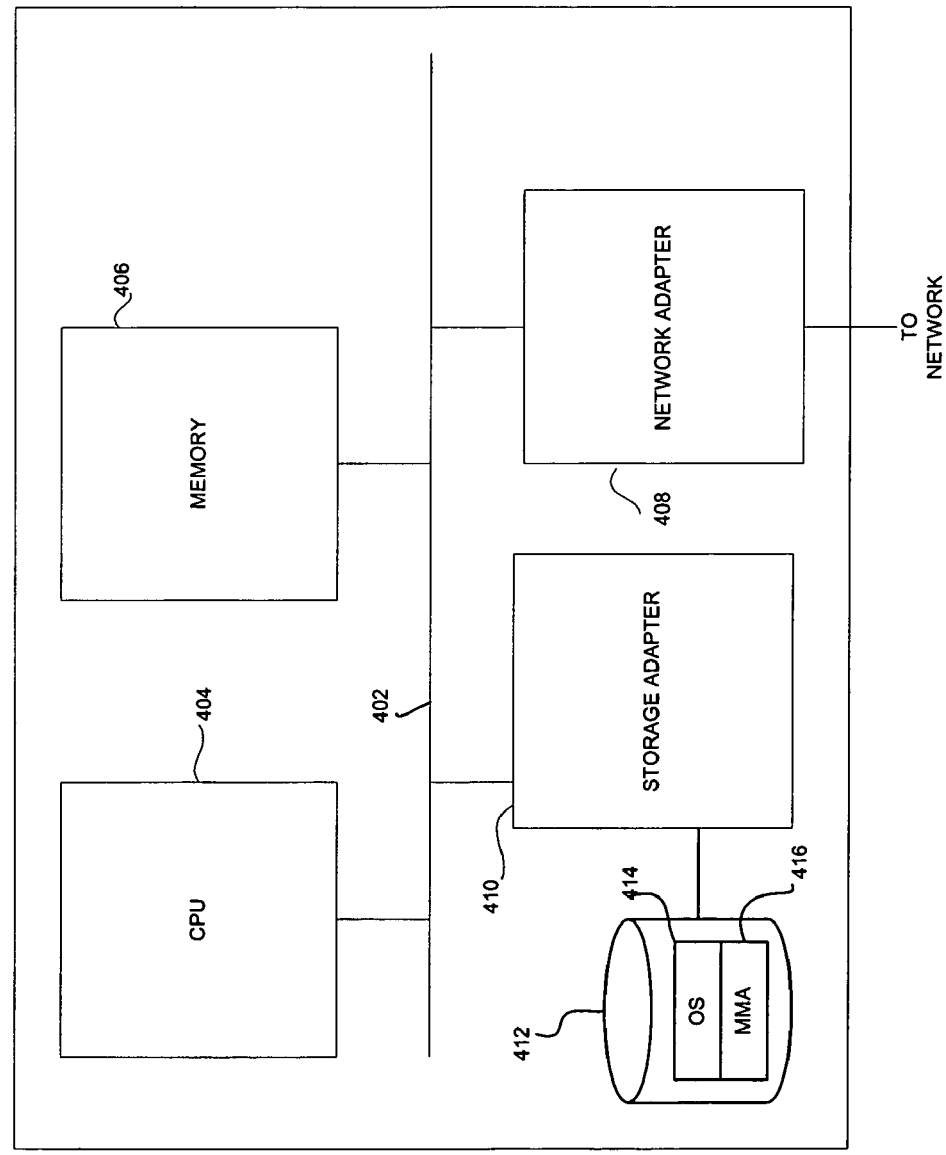
FIG. 4 illustrates a server according to certain embodiments of the invention.

FIG. 4 illustrates a server 400, representative of the server station 104. The server 400 includes a bus 402, which may include one or more interconnected buses, such as SCSI buses, PCI buses, etc. A processor 404 is coupled to the bus 402, and performs processing functions for the server 400. The processor 404 may be any suitable processor such as those manufactured by Intel® or Motorola®. A memory 406 is also coupled to the bus 402. The memory 406 may encompass one or more memories, including random access memory (RAM), read only memory (ROM), flash memory, etc.

A network adapter 408 allows the server 400 to communicate with remote processing systems over a network, such as the network 100. For example, the server 400 may communicate with the filers 106 over the storage network 100. A storage adapter 410 allows the server 400 to communicate with storage 412. The storage 412 may include, for example, the server's operating system 414, as well as software 416 to execute the MMA 102. It is understood that other server configurations may be used with the embodiments of the invention.

Figure 5B:
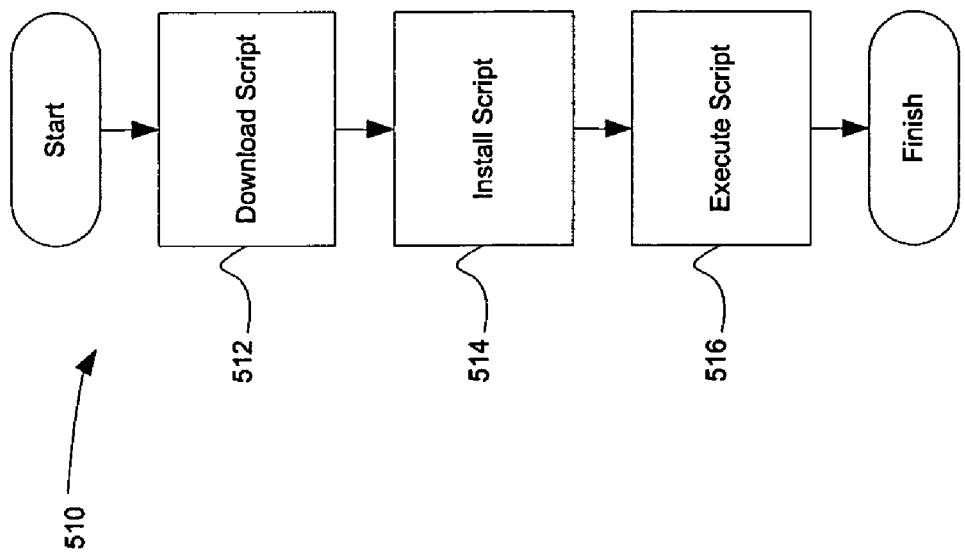
FIGS. 5A and 5B are flowcharts describing a process for generating and executing a script according to one embodiment of the invention.
Figure 5A:
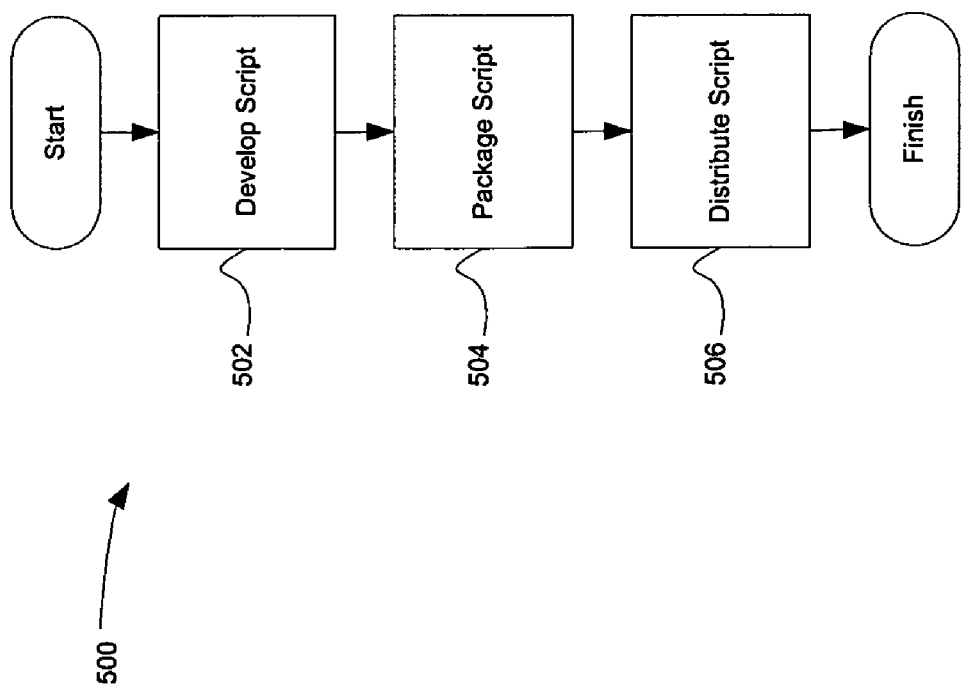

FIGS. 5A and 5B are flowcharts describing a process for generating and executing a script according to one embodiment of the invention. FIG. 5A describes a process 500 for creating a script, and FIG. 5B describes a process 510 for obtaining and installing a script. The process 500 may be performed by a system administrator on an external system such as the terminal 108 or using the MMA 102. The process 510 may be performed using the MMA 102. Using the processes 500 and 510, a system administrator can generate a script to add functionality to the MMA 102. The script may be run by scheduling a command, as described above. The command may be scheduled by a system administrator or other user within the framework of the MMA 102. Because the MMA 102 executes the script, any function that may be performed by the MMA 102 may be used within the script. For example, the script can be executed on any of the filers 106, can modify the storage on the volumes 110, can generate events, etc.

In block 502, a script is developed. A developer may write the script using known scripting languages for a specific need of the MMA 102. For example, the MMA 102 may include a PERL interpreter and the script could be written in PERL, or the script may be written in the extensible markup language (XML). A schema for generating a sample script is shown below. The script may also include executable files that may be run separately.

In block 504, the script is packaged into a specific format, for example, the ZIP format. The package may include not only the script, but also any other ancillary files necessary for the execution of the script. In block 506, the script is distributed using a known distribution channel, such as through a network using protocols such as HTTP, etc. After block 506, the script has been generated and distributed. The process 510 of FIG. 5B describes downloading and installing the script in the MMA 102.

In block 512 of the process 510, an administrator downloads the script to the storage 412 of the server station 104 using the distribution method. In block 514, the script is installed into the MMA 102. The process of installing the script will be explained further below when discussing FIG. 6. In block 512, the script is executed by the sever station 104 in the MMA 102. For example, the script may be scheduled for execution by a system administrator using certain functions of the MMA 102. As discussed above, the script may be executed when an administrator schedules a command with the MMA 102, which will be run by the scheduler 208.

Figure 6:
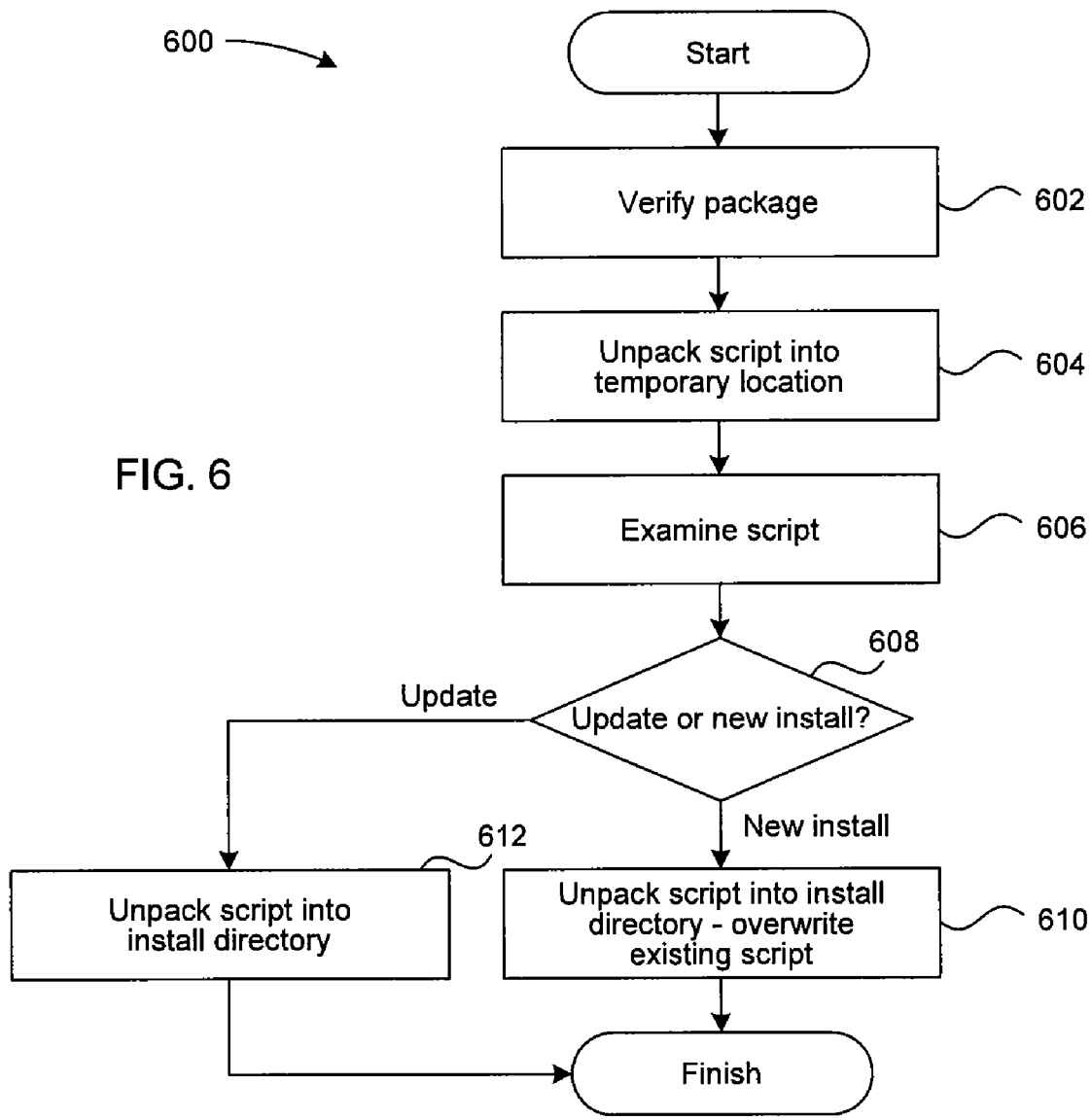
FIG. 6 is a flowchart describing a process for installing a script into an MMA.

FIG. 6 is a flowchart describing a process 600 for installing a script into the MMA 102. The process 600 further describes the block 510 above according to an embodiment of the invention. The process 600 may be performed by the MMA 102 according to one embodiment of the invention. The functionality in the process 600 may be added to the MMA 102 for these purposes. In block 602, a transmitted package, such as the package 112 is verified by the MMA 102 to determine whether the package conforms to predetermined specifications for the package. The predetermined specifications of the package may be determined and specified by a system administrator. For example, the package may have to be of a certain format (e.g., ZIP), the package may have a maximum size, etc. The package may include a script such as the script 114 and any other accompanying files needed to run the script. The package may include, for example, executable files, data files, other scripts, etc.

In block 604, the package is unpacked into a temporary location. For example, the package may be unpacked into a predetermined temporary directory on the server 400. A package may be a file (or other data construct) that is an archive of one or more files (or other data constructs). For example, the package may be a compressed ZIP file that includes the script and supporting files. Unpacking the package extracts the files (or other data constructs), expanding them if necessary, into the desired location. In block 606, the script is verified to ensure that it is properly formatted, and that it will execute properly. The verification examines the script to ensure that all function calls are proper, all variables are properly defined, etc. The script may be written in any scripting language, such as the practical extraction and reporting language (PERL), JavaScript, etc. In block 606, the server 400 determines whether the MMA 102 will be able to properly execute the script. The server 400 may examine the script to determine the resources used by the script and determine whether the script is compatible with the configuration of the MMA 102. For example, the server 400 may determine that certain features of the MMA 102 that the script needs to use are not activated. The MMA 102 may then prompt the system administrator to activate the features in order to continue using the script.

In block 608, it is determined whether the package includes an update or a new install of MMA functionality. When the script is written, the author may include an indication of whether the script is a new installation or an update of a current version used by the MMA 102. If the package includes a new install of existing functionality, the script should overwrite the previous installation in block 610. If the package includes an update of existing functionality or a new functionality, the script contained in the package can be unpacked into the install directory in block 612.

Any of various different functionalities may be added to the MMA 102 using scripting languages. These functionalities can expand the abilities of the MMA 102 without disturbing the core of the MMA 102. For example, since the scripting language is installed independently of the core of the MMA 102, the core will not be damaged if an error affects the operation of the script. The script is run by the scripting interpreter 209 (such as a PERL or XML interpreter) associated with the MMA 102. The interpreter executes the script, which can add functionality to the base functionality of the MMA 102 using scripting commands, but does not fundamentally alter the core of the MMA 102. The core of the MMA 102 includes the functionality required for operation of the MMA 102. The core typically includes compiled code (i.e., executables) that is delivered when the MMA 102 is installed. These core functions typically include the basic functions of the MMA 102, such as the monitoring ability, the ability to generate events and report to system administrators, etc. The script can also be easily removed from the MMA 102. Further, using a scripting language to update the MMA 102 provides transparency of scripting, allowing system administrators to examine the scripts.

Figure 7:
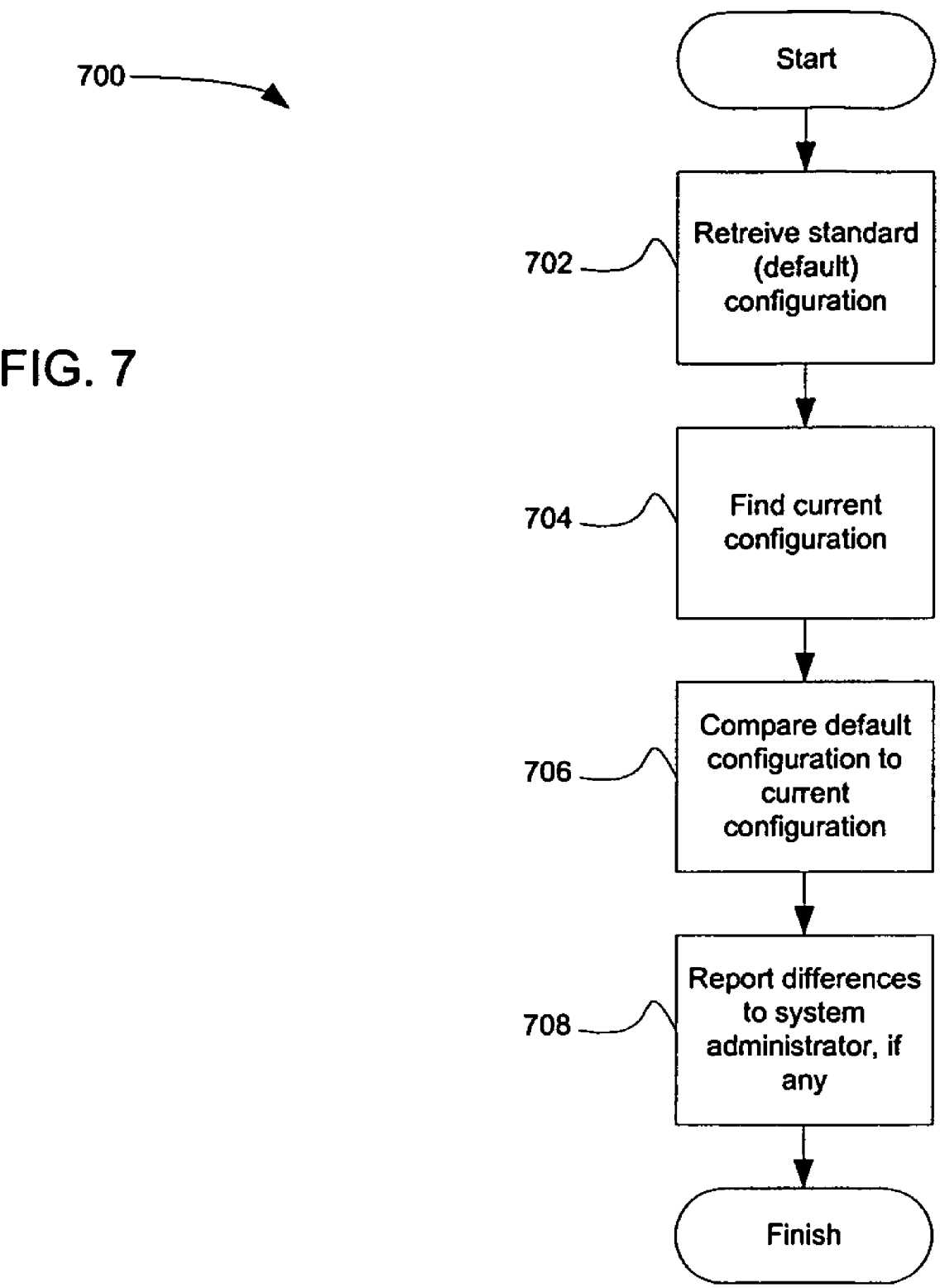
FIG. 7 is a flowchart describing the functionality of a script for monitoring configuration changes of filers.

Administrators of the network 100 may want to ensure that every filer 106 behaves in the same way, and therefore may want to determine that the standard configuration of the filers 106 has not changed. This functionality may be added to the MMA 102 using scripting, as described above. FIG. 7 is a flowchart describing the functionality of a script for monitoring configuration changes of filers. For example, a standard configuration may be generated for the filers 106. This standard configuration may be deployed to every filer 106 coupled to the storage network 100. The process 700 describes the operation of the configuration script.

In block 702, the standard, or default, configuration for the filers 106 is retrieved. This configuration may be stored in the storage 412 of the server 400, for example. In block 704, the current configuration of a filer 106 being examined is retrieved. The configuration may be determined by examining the configuration settings of a filer 106. For example, the filer 106 may include several configurable settings that may be modified by administrators, program applications, etc. The configuration may be stored by the filer 106 in a configuration file that is accessible by the operating system of the filer 106. The process 700 retrieves the configuration file in block 704.

In block 706, the default configuration is compared to the current configuration. For example, the configuration of the filer 106 may include several individual settings, such as limits on the number of volumes managed by the filer 106, limits on the number of users, etc. The process 700 compares each of these settings individually to determine whether the setting in the default configuration is the same as the setting in the current configuration. If any setting is different, the process 700 notes which setting is different and what the current setting is, and places these values in a comparison file.

In block 708, the differences, if any, are reported to a system administrator. As mentioned above, the comparison file may include the differences between the default configuration and the current configuration of the filer 106. The differences may be reported by generating an event, as described above.

According to another embodiment of the invention, a script may be used to track changes to the configuration settings over time. According to this embodiment, the current configuration is compared to a previous configuration. For example, the script may instruct the filer 106 to save the configuration of the filer 106 at a point in time. The process 700 could then be carried out, substituting the saved configuration for the default configuration. According to this embodiment, in block 702, the previous configuration would be retrieved, rather than the default configuration.

Figure 8:
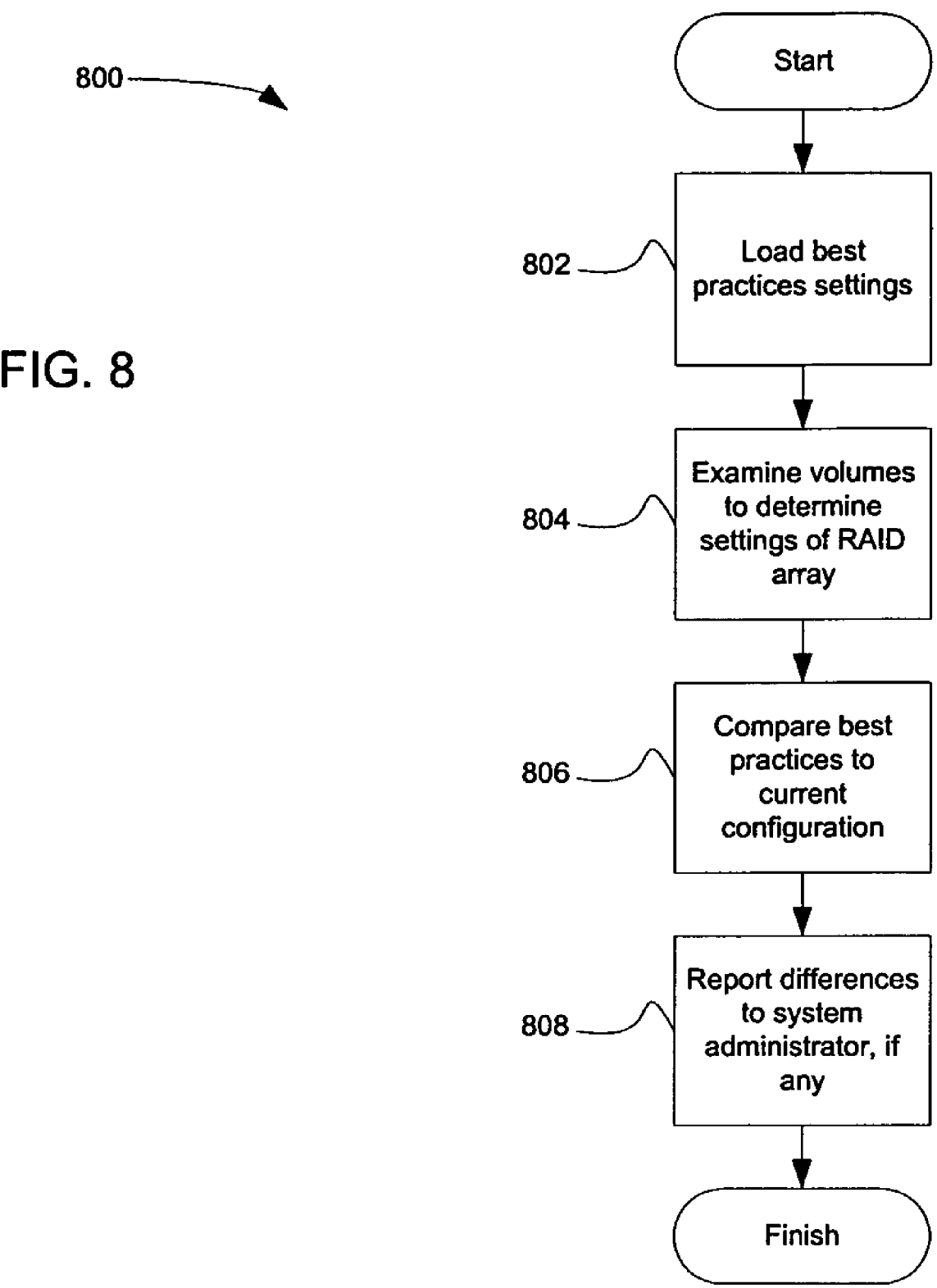
FIG. 8 is a flowchart describing a process that can be implemented in a script for determining best practices compliance when using RAID.

FIG. 8 is a flowchart describing a process 800 that can be implemented in a script for determining best practices compliance when using RAID. Best practices is a check used with RAID volumes to determine whether they are correctly configured. For example, a best practices check might determine whether a RAID array includes the correct number of volumes, the correct size per volume, the required amount of free space per volume, etc.

In block 802, the script loads the best practices settings for the filer 106 being examined. The best practices settings are a "policy" for the RAID managed by the filers 106. The policy ensures that each volume 110 is configured properly. In block 804, the MMA 102 examines at least one of the volumes 110 to determine the current configuration of the RAID arrays. The configuration of the RAID includes the number of disks per volume, the size of each volume, etc.

In block 806, the script compares the current configuration to the policy for the volumes 110. If the script determines that one of the volumes is misconfigured, in block 808, the script generates an event to notify a system administrator of the misconfiguration.

The techniques introduced above have been described in the context of a network attached storage (NAS) environment. However, these techniques can also be applied in various other contexts. For example, the techniques introduced above can be applied in a storage area network (SAN) environment. A SAN is a highly efficient network of interconnected, shared storage devices. One difference between NAS and SAN is that in a SAN, the storage server (which may be an appliance) provides a remote host with block-level access to stored data, whereas in a NAS configuration, the storage server provides clients with file-level access to stored data. Thus, the techniques introduced above are not limited to use in a file server or in a NAS environment.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are accordingly to be regarded in an illustrative rather than in a restrictive sense.

What is claimed is:

1. A method for determining whether a configuration of a storage server has changed comprising:
   receiving at a storage server managed by a storage server management application (SSMA) a package which includes a script;
   executing the script on the SSMA to add functionality to the SSMA for detecting a deviation of a current configuration from a default configuration;
   determining the current configuration of the storage server;
   determining the default configuration of the storage server;
   comparing the current configuration to the default configuration;
   generating an event if the current configuration differs from the default configuration; and
   causing an indication of the event to be output to an administrator.

2. The method of claim 1, wherein the default configuration is shared by a group of storage servers.

3. The method of claim 1, wherein generating an event comprises:
   monitoring the storage server;
   writing information resulting from the monitoring to a database;
   retrieving information from the database; and
   generating the event if the default configuration differs from the current configuration.

4. The method of claim 1, further comprising scheduling the comparing if an access level of the system administrator is sufficient.

5. A machine readable storage medium storing code which embodies a storage server management application (SSMA), the SSMA comprising:
   a monitor to monitor a plurality of storage servers coupled to the SSMA and to write information acquired about the storage servers to a database;
   a scheduler to execute a script installed on the SSMA wherein the script causes functionality to be added to the SSMA for detecting a deviation of a current configuration from a specified configuration and for comparing the current configuration to the specified configuration; and
   an event daemon to generate an event when the current configuration does not match the specified configuration and to output an indication of the event to an administrative user.

6. The machine readable storage medium of claim 5, further comprising a web server to distribute the event to a terminal coupled to the SSMA.

7. The machine readable storage medium of claim 5, wherein the script is separate from and does not affect a core functionality of the SSMA.

8. The machine readable storage medium of claim 5, wherein the script monitors compliance with a best practices policy for a RAID array of the storage servers.

9. The machine readable storage medium of claim 5, wherein the script uses access control functionality of the SSMA.

10. The machine readable storage medium of claim 9, wherein the script can be scheduled only by users belonging to a specified group.

11. A method comprising:
   executing, in a server computer, a storage server management application (SSMA) for managing a plurality of storage servers, the SSMA having a set of core functionality;
   receiving, at the server computer, a package which includes a script; and
   adding functionality to the SSMA without altering the core functionality, by operating the SSMA to execute the script, wherein the script causes functionality to be added to the SSMA for detecting a deviation of a current configuration from a specified configuration, and wherein the script causes the SSMA to compare the current configuration to the specified configuration, to generate an event when the current configuration does not match the specified configuration, and to cause an indication of the event to be output to an administrative user.

12. A method as recited in claim 11, wherein the current configuration is for one of the storage servers or a storage array associated with one of the storage servers.

13. A method as recited in claim 11, wherein the current configuration and the specified configuration are for one of the plurality of storage servers.

14. A method as recited in claim 13, wherein the specified configuration is a default configuration for said one of the storage servers.

15. A method as recited in claim 13, wherein the specified configuration is a previous configuration of said one of the storage servers.

16. A method as recited in claim 11, wherein the current configuration and the specified configuration are for a RAID array associated with at least one of the plurality of storage servers.

17. A computer system comprising:
   a processor;
   a network adapter, coupled to the processor, through which to communicate with a plurality of storage servers;

a storage server management application (SSMA) to manage the plurality of storage servers, the SSMA having a set of core functionality; and code which, when executed in the processing system, causes the computer system to receive a package which includes a script from a remote device over a network, install the script in the computer system, and add functionality to the SSMA without altering the core functionality, by operating the SSMA to execute the script, wherein the script causes functionality to be added to the SSMA for detecting a deviation of a current configuration from a specified configuration, and wherein the script causes the SSMA to compare the current configuration to the specified configuration, to generate an event when the current configuration does not match the specified configuration, and to cause an indication of the event to be output to an administrative user.

18. A computer system as recited in claim 17, wherein the current configuration is for one of the storage servers or a storage array associated with one of the storage servers.

19. A computer system as recited in claim 17, wherein the current configuration and the specified configuration are for one of the plurality of storage servers.

20. A computer system as recited in claim 19, wherein the specified configuration is a default configuration for said one of the storage servers.

21. A computer system as recited in claim 19, wherein the specified configuration is a previous configuration of said one of the storage servers.

22. A computer system as recited in claim 17, wherein the current configuration and the specified configuration are for a RAID array associated with at least one of the plurality of storage servers.

* * * * *